United States Patent
Li (10) Patent No.: US 11,327,792 B2
(45) Date of Patent: *May 10, 2022

(54) HASHING DATA-PROCESSING STEPS IN WORKFLOW ENVIRONMENTS

(71) Applicant: SEVEN BRIDGES GENOMICS, INC., Cambridge, MA (US)

(72) Inventor: Yilong Li, Cambridge, MA (US)

(73) Assignee: SEVEN BRIDGES GENOMICS, INC., Boston, MA (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/721,143

(22) Filed: Dec. 19, 2019

(65) Prior Publication Data
US 2020/0201675 A1    Jun. 25, 2020

Related U.S. Application Data

(63) Continuation of application No. 15/699,305, filed on Sep. 8, 2017, now Pat. No. 10,545,792.

(60) Provisional application No. 62/393,203, filed on Sep. 12, 2016.

(51) Int. Cl.
*G06F 9/48* (2006.01)
*G06Q 10/06* (2012.01)
*H04L 9/06* (2006.01)
*G06Q 10/10* (2012.01)

(52) U.S. Cl.
CPC ........... *G06F 9/4881* (2013.01); *G06Q 10/06* (2013.01); *G06Q 10/0633* (2013.01); *G06Q 10/103* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 7,610,263 | B2* | 10/2009 | Dettinger | G06F 16/20 |
| 9,552,458 | B2* | 1/2017 | White | G16B 20/10 |
| 10,528,367 | B1* | 1/2020 | Liu | G06F 9/4498 |
| 2012/0054768 | A1* | 3/2012 | Kanna | G06F 9/5027 718/104 |
| 2012/0233617 | A1* | 9/2012 | Onno | H04N 5/262 718/100 |
| 2013/0073858 | A1* | 3/2013 | Lim | H04L 9/3073 713/176 |
| 2015/0143064 | A1* | 5/2015 | Bhargava | G06F 11/1451 711/162 |
| 2016/0275244 | A1* | 9/2016 | Nilsson | H04L 63/20 |
| 2016/0371193 | A1* | 12/2016 | Floratou | G06F 12/0888 |

(Continued)

*Primary Examiner* — Abu Zar Ghaffari
(74) *Attorney, Agent, or Firm* — Morgan, Lewis & Bockius LLP (57) ABSTRACT

Various approaches for data storage and retrieval for a computer memory include processing a computational workflow having multiple data-processing steps, generating and storing a first hash value associated with a first step of the data-processing steps based on an input to the first step, generating and storing a second hash value associated with a second step of the data-processing steps based on the generated first hash value, and reconstructing a computational state of the workflow based on the second hash value, and thereby avoid re-execution of a portion of the workflow corresponding to the second hash value.

14 Claims, 10 Drawing Sheets

(56) References Cited

U.S. PATENT DOCUMENTS

2017/0255886 A1* 9/2017 Schmidt ............. G06Q 10/0633
2017/0262778 A1* 9/2017 Ganesan ............... H04L 9/3247

* cited by examiner

| Workflow Step 404 | Input to Hash Function 406 | Resulting Hash Value 402 |
|---|---|---|
| 1. Trim Adapters | "reads.fastq – APP_ID – ARGV" or "G9TZ + APP_ID + ARGV" | SGJW |
| 2. Bowtie Alignment | "SGJW – APP_ID – ARGV" | EO5Y |
| 3. Sort | "EO5Y + APP_ID – ARGV" | FSLI1 |
| 4. Call Variants | "FSLH – APP_ID – ARGV" | Y7GW |

FIG. 4

| Workflow Step 404 | Resulting Hash Value 402 | Pointer to Output File 502 |
|---|---|---|
| Trim Adapters | SGJW |  |
| Bowtie Alignment | EO5Y |  |
| Sort | FSLH |  |
| Call Variants | Y7GW |  |

HASHING DATA-PROCESSING STEPS IN WORKFLOW ENVIRONMENTS

RELATED APPLICATION

This application is a continuation of U.S. Ser. No. 15/699,305, filed Sep. 8, 2017, which claims the benefit of and priority to U.S. Provisional Application No. 62/393,203, filed Sep. 12, 2016, the entire disclosure of which is hereby incorporated herein by reference.

TECHNICAL FIELD

The field of the invention relates generally to workflow environments and, more particularly, to systems and methods for composing and executing a series of workflow steps involving bioinformatics processing.

BACKGROUND

In many industries, information technology platforms for technical computing have become key differentiators and drivers of business growth. For companies in these industries—including the biotechnology, pharmaceutical, geophysical, automotive, and aerospace industries, among others—business-critical technical computing tasks have become complex, often involving multiple computational steps with large quantities of data passing from one step to the next. In addition, the individual computational steps themselves are often computationally intensive and very time consuming.

In contemporary genomics, for example, researchers often query dozens of different databases using a variety of search and analysis tools. To handle these complex tasks efficiently and facilitate distributed processing, data may be moved from one analysis step to the next in "pipelined" or "workflow" environments that chain a series of connected tasks together to achieve a desired output. Researchers can use workflow environments to design, share, and execute workflows visually, as opposed to manual execution or the generation of a series of shell scripts. Such workflow environments can be used to perform basic local sequence alignment and search, molecular biology data analyses, and genome-wide association studies, among others. These workflow environments, which are both computationally intensive and logistically complex, are becoming essential to handling the large amount of data coming out of modern, highly automated laboratories.

Workflows in workflow environments typically comprise a series of connected steps each having one or more inputs, one or more outputs, a set of arguments, and an application that performs the task associated with the step. The outputs are then provided as inputs to the next step in the workflow environment. For example, with reference to FIG. 1, a common alignment and variant calling workflow called "bowtie_gatk" includes a Burrows-Wheeler Transform (BWT) based aligner (Bowtie2) for human genome resequencing and the Genome Analysis Toolkit (GATK) for variant calling. Given a set of sequence reads and a reference genome, the bowtie_gatk workflow may: (1) trim adapter sequences from the sequence reads; (2) perform a reference alignment using the Bowtie2 aligner; (3) sort the resulting alignment; and (4) call variants using GATK.

While Bowtie2 advantageously provides a fast and memory-efficient tool for aligning sequencing reads to long reference sequences and GATK offers a wide variety of tools for separating data-access patterns from analysis algorithms, several kinds of problems may affect efforts to combine these tools in large-scale workflow environments. First, failures may occur at points along the workflow. These can be caused by an incorrect configuration (e.g., an end user specifying the wrong tool or parameter), or may be attributed to the workflow environment itself. If a failure point occurs at a later stage of the workflow, it may be necessary to restart the entire workflow from the beginning, thus wasting time and computational resources. Second, workflows often have many shared steps, which can lead to processing redundancies. For example, a researcher may decide to vary the above workflow to use a different alignment tool and a different variant caller in order to compare results. Even though they use the same initial adapter trimming step, in each case the workflows are executed independently. Similarly, several users operating on the same original data set may generate workflows that are nearly identical but separately executed. In workflow environments leveraging cloud computing resources, these redundancies may lead to significant costs both monetary and in terms of resource utilization.

Users aware of these issues may redesign their workflows to improve efficiency. For example, a savvy user may decide to combine four similar workflows together into a single workflow. An initial adapter trimming step may provide an output file to separate alignment steps, which in turn provide output files to separate variant calling steps. This reduces the number of operations from 16 (4×4 workflows) to only 7. However, this requires extra planning and time on the part of the user, which is not transferred to other users. For example, the records associating files with the steps in which they originate or are used can be obfuscated, and in any case, it is challenging and cumbersome to maintain explicit records relating each of the different possible combinations of workflow steps to their associated files.

Accordingly, there is a need for workflow environments that process data in a more efficient manner without requiring significant planning from the user.

SUMMARY

The present invention provides systems and methods for efficiently composing and executing a workflow having multiple data-processing steps by improving the ability to automatically reconstruct a computational state (e.g., an order of executing the data-processing steps) of the workflow. In various embodiments, a hash value associated with a first data-processing step in the workflow is first generated using a known hash function; the hash value of a subsequent step is then created based at least in part on the hash value associated with a previous step. Because the hash value in each step (other than the first) includes information about the hash value generated in the previous step, the hash value implicitly identifies the entire history of the processing steps involved in a workflow up to that point. Accordingly, in some embodiments, the processor reconstructs the computational state of the workflow based on the hash value of the processing step immediately before interruption or completion of the workflow; this approach thus avoids re-executing one or more portions of the workflow prior to the interruption or completion of the workflow. In addition, because the hash value associated with each data-processing step may be automatically generated and the computational state may be automatically reconstructed based on the generated hash value, approaches described herein advantageously eliminate the need of extensive user planning and reconfiguration of the workflow environment.

The term "consists essentially of" means excluding other materials that contribute to function, unless otherwise defined herein. Nonetheless, such other materials may be present, collectively or individually, in trace amounts. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing will be more readily understood from the following detailed description of the invention, in particular, when taken in conjunction with the drawings, in which.

DETAILED DESCRIPTION

A. Hash Table Generation

Figure 1:
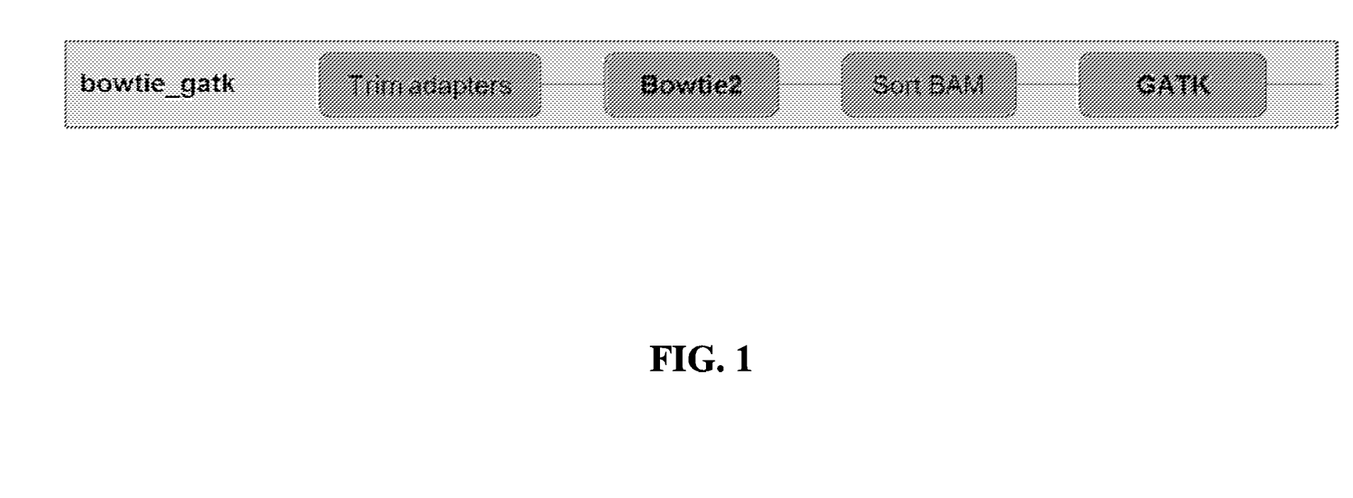
FIG. 1 depicts an exemplary workflow including several bioinformatics tools, including Bowtie2 and GATK.
Figure 2A:
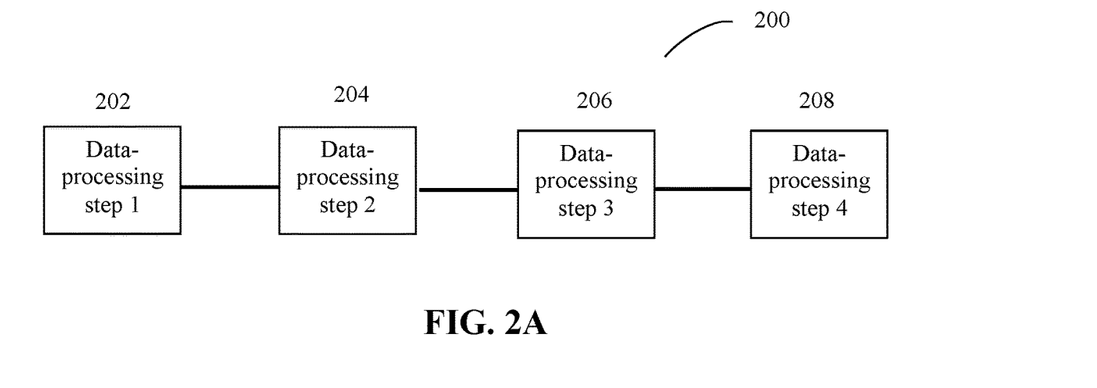
FIGS. 2A and 2B schematically depict data-analysis workflows including multiple processing steps in accordance with various embodiments.

Although the bowtie_gatk workflow depicted in FIG. 1 represents a typical bioinformatics workflow, for purposes of illustration and explanation the more generic workflow constructs shown in FIGS. 2A and 2B will be discussed. FIG. 2A schematically depicts an exemplary data-analysis workflow (or pipeline) 200 including four data-processing steps generically indicated at 202-208 that may, for example, correspond to the steps in the bowtie_gatk workflow (as shown in FIG. 1). Each data-processing step is executed by a computer application (or a "tool") that can receive data from another application(s) or device (e.g., a sequencer) and/or a computer memory or input device, store data in the computer memory, and/or perform a desired analysis or processing (e.g., alignment, variant calling, RNA splice modeling, quality control, or formatting) on the received data. Generally, the data-processing steps are linked sequentially (or in a series)—i.e., at least a portion of output data generated by a previous step is utilized by a subsequent step as at least a portion of its input data. For example, an analytical workflow may begin by obtaining multiple sequence reads in a first step, then performing quality control on the "reads" (i.e., sequence data) in a second step, assembling the reads into "contigs" (i.e., overlapping reads) in a third step, and comparing the contigs to references, such as the human genome (e.g., hg18), to detect mutations in a fourth step.

Figure 2B:
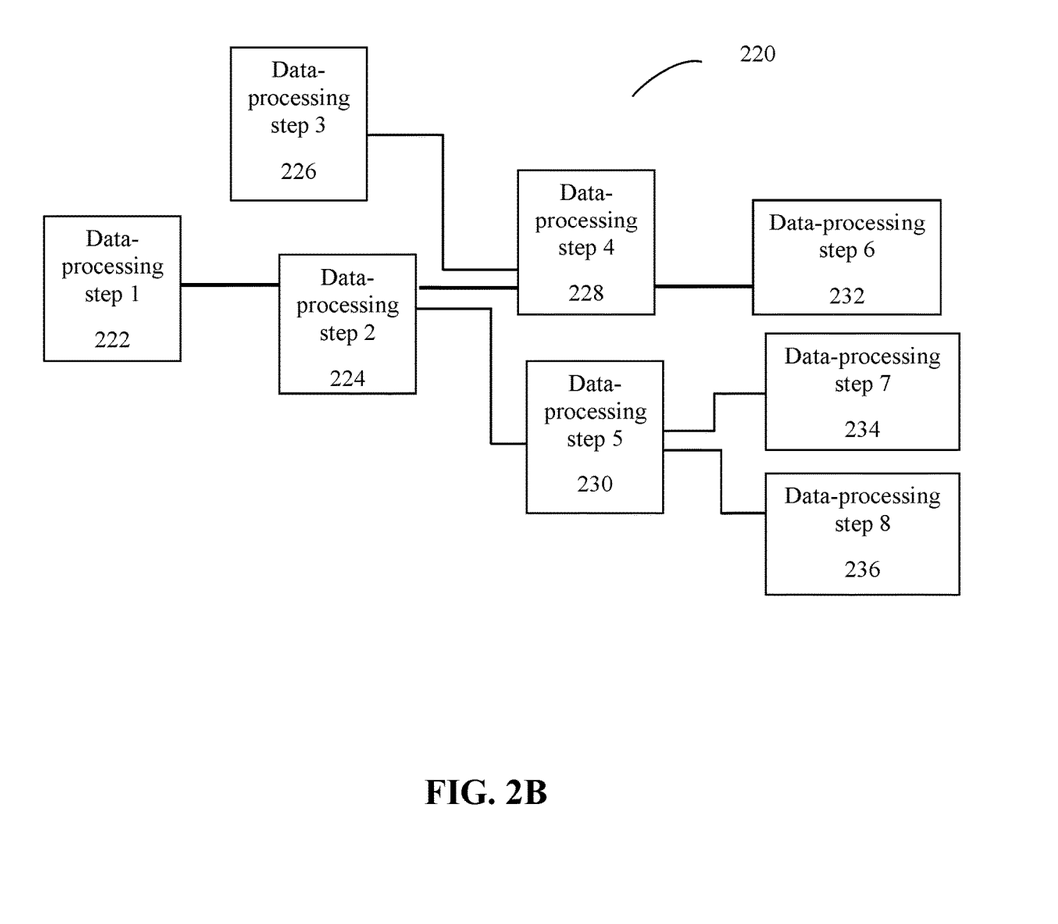

The workflow shown in FIG. 2B includes multiple data-processing steps 222-236 that are linked in a web configuration—i.e., the output data generated from at least one step is utilized as input data for two or more subsequent steps and/or at least one step receives its input data from two or more previous steps.

Figure 3:
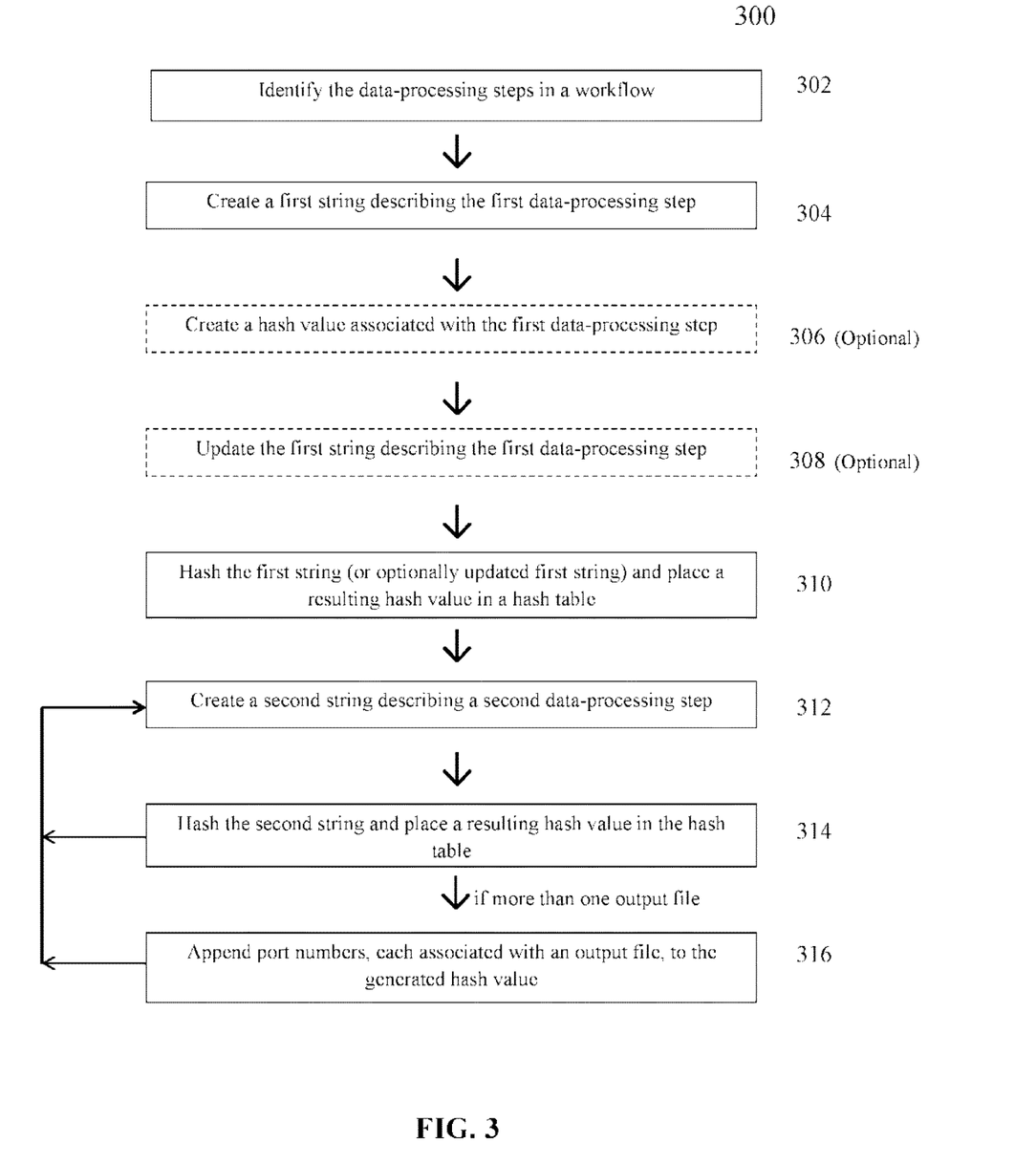
FIG. 3 is a flow chart illustrating an approach for creating a hash table in accordance with various embodiments.

To improve a computer processor's capability of executing the data-processing steps in the workflow 200, in various embodiments, a hash table storing multiple hash values, each associated with an individual data-processing step in the workflow, is created. FIG. 3 illustrates an exemplary approach 300 to generating the hash table. In a first step 302, a computer processor processes the workflow 200 to identify each of its component data-processing steps. For example, the processor may identify adapter trimming, reference alignment, sorting, and variant identification in the above-described "bowtie_gatk" workflow. Each workflow step may be uniquely identified by its associated computer application (which may include a name, a version, a container or virtual machine storing the computer application (e.g., identified by a Docker ID), or some other unique identifier thereof), a set of input data, and/or a set of parameters utilized in the workflow step.

In a second step 304, the processor creates a first string describing the first step identified in the workflow. The first string is a special case because the first step may not have any hashed inputs to include within the first string. In one embodiment, the first string simply includes or consists of a concatenation of the input files to the first step, the computer application associated with the first step, and parameters provided by the user and/or included in the first step. For example, in the "bowtie_gatk" workflow described above, the first string associated with the first step may be "reads.fastq fastx_clipper-a GACTCA", where "reads.fastq" denotes a filename of an input FASTQ file, "fastx_clipper" denotes the application utilized for trimming adapter sequences from the sequence reads in the input FASTQ file, and "-a GACTCA" denotes user-provided parameters. The first string may also or alternatively include other information, such as a full command line actually used to execute the function in the first processing step.

In various embodiments, a conventional hash function is optionally utilized to hash all or part of the contents of any input file to the first data-processing step and create a hash value associated therewith (in an optional third step 306). Generally speaking, a hash function is an algorithm configured to produce a condensed representation (i.e., hash value) of an input stream of data or a message. A hash function may be cryptographically secure to the extent that it is computationally difficult to reconstruct a message from its hash value and/or to generate the same hash value from two different messages. The cryptographic hash function may thus create a different hash value if a modification (in some cases, even of only one bit) is applied to a given message. Accordingly, the cryptographic hash function may be useful for ensuring data integrity, for example, by enabling the detection of changes to a message due to errors or tampering. In addition, the cryptographic hash function may advantageously create hash values having the same, fixed length regardless of the size of data being hashed. Because of these features of a cryptographic hash function, hashing data associated with the input file to the processing step (e.g., all or part of the contents thereof) has an advantage of uniquely identifying the input file by its corresponding hash value without considering its filename and/or how it was created.

One exemplary hash function is given by the Message Digest 5 (MD5) standard. The MD5 hash function iteratively processes a message in 512-bit blocks to produce a 128-bit hash of the message. Other exemplary hash functions are given by the Secure Hash Algorithm (SHA) standard, including SHA-1, SHA-256, SHA-384 and SHA-512. For example, the SHA-256 hash function iteratively processes a message in 512-bit blocks to produce a 256-bit hash of the message. It should be noted that the current invention may implement any suitable hash function and is not limited to any particular such function. For example, any cryptographic hash function that includes a suitable, well-defined procedure or mathematical function for mapping data of any arbitrary size (e.g., a string of symbols) to any fixed-size bit string can also be employed.

After the hash value of the input file to the first processing step is optionally created, in a fourth optional step 308, the hash value may be substituted for at least a portion of the first string created in step 304. For example, if an MD5 function is applied to hash the input FASTQ file and generates a hash value "G9TZ," the first string describing the first data-processing step of the workflow may be updated as "G9TZ fastx_clipper-a GACTCA," where the filename "reads.fastq" is replaced by the hash value G9TZ." It should be stressed that besides hashing the FASTQ input file, the cryptographic hash function may additionally and/or alternatively hash the filename, computer application name, instructions associated with the computer application, and/or other features associated with the first data-processing step to generate a hash value associated therewith. Again, the generated hash value may substitute at least a portion of the first string describing the first processing step of the workflow.

Alternatively, in some embodiments, steps 306 and 308 are omitted from the exemplary approach 300 of hash table generation. For example, the input file to the first step may already have an associated hash value stored for retrieval. This associated hash value may be previously generated from an upload process, in which every time a file is uploaded, a hash value is computed and stored with the file. Preferably, the hash value is computed from the contents of the file. This is useful in workflow environments where multiple users may be uploading identical datasets separately. In some embodiments, users working with a dataset (e.g., The Cancer Genome Atlas (TCGA) dataset) will generally use the same input files. For example, the Cancer Genomics Cloud (CGC), available at http.//cgc.sbgenomics.com, is a cloud-based workflow environment that co-locates the TCGA dataset with bioinformatics tools for analysis. In this case, generating a hash value for input files may be unnecessary, in which case the inputs to the string describing the first data-processing step may then be identified by the actual file name of the input file (or any unique identifier associated with the input file). In this way, hashing the input file as described in steps 306 and 308 may be unnecessary.

In a fifth step 310, the processor further hashes the first-processing-step associated string updated in step 308 (or, the associated string created in step 304) to generate a unique hash value and places the hash value in a hash table. For example, a four-letter unique hash value, such as SGJW, may be created by hashing the first string "G9TZ fastx_clipper-a GACTCA" obtained in step 308. The cryptographic hash function used in this step may be the same as that used in step 306. In various embodiments, the hash table, indexed by the hash values contained therein, includes data entries that can be directly accessed via the hash values. For example, the hash table may include a pointer that associates the hash value created in step 310 with the output file(s) of the first data-processing step, returns a location for the associated output file(s) and/or causes the processor to retrieve the output file(s). The hash table thus advantageously allows another workflow to look up in the hash table the hash value associated with at least one of its processing steps and determine whether the output of the processing step has already been computed. For example, if a subsequent workflow implements the same first data-processing step as described above, the generated hash value associated therewith in the subsequent workflow is the same as that created in step 310. Upon finding a matching hash value in the hash table, the output file(s) associated with the matching hash value may be retrieved for further processing in the subsequent workflow, thereby avoiding redundant processing. In some embodiments, the pointer in the hash table also associates the hash value to other information, including, for example, the updated first string created in step 308 and/or statistics regarding the frequency of implementing the processing step and/or accessing the output file(s) as further described below.

In a sixth step 312, the processor generates a second string describing a second data-processing step of the workflow. In one embodiment, the hash value generated for the previous processing step is incorporated in the second string. For example, with reference to FIG. 1, the string associated with the second data-processing step ("Bowtie2") may include "SGJW bowtie hg19," where "SGJW" is the hash value generated for the first processing step ("trim adapters"). The second string is then hashed using the same or different hash function described above to create a second hash value associated with the second data-processing step; the second hash value is then placed in the hash table as well (in a seventh step 314). Steps 312 and 314 may be iteratively executed across the remaining data-processing steps in the workflow.

Accordingly, the hash value in the current step is computed in part from the hash value for the previous step and in a manner that unambiguously identifies the previous step. As a result, the currently generated hash value thus implicitly identifies the entire history of the processing steps involved in a workflow up to that point. This feature is distinct from conventional memorization techniques, where only the explicit parameters associated with a processing step are hashed. In various embodiments, based on the hash value of a data-processing step occurring immediately prior to a workflow interruption or completion, the processor reconstructs the execution order of all data-processing steps involved prior to the interruption or completion. This approach therefore improves the processor's efficiency in reconstructing the workflow and avoids re-executing one or more portions thereof. In addition, this approach guarantees that any output files associated with identical hash values have the same contents because they have an identical processing history.

In some embodiments, one or more data-processing steps (e.g., steps 224 and 230 in FIG. 2B) generate more than one output file that may be initially assigned the same hash value. To distinguish the output files from one another, in one preferred embodiment, the hash value of each output file is appended with a port number of the associated data-processing step (in an eighth step 316). In a workflow environment, each data-processing step may typically have a set of associated "ports" that represent the input files or output files. For example, a tool may be "wrapped" with an appropriate script or wrapper (e.g., written using Common Workflow Language, or CWL, available at https://github.com/common-workflow-language/common-workflow-language). The wrapper will describe the tool, its parameters, and provide numbered "ports" for each of the input and output files. Because the port numbers are always the same for a given data-processing step using a particular wrapper, each port number may uniquely identify each output file of the step. For example, in a data-processing step, such as that utilizing Bowtie2, the output alignment may be associated with the first output port, and various statistics or other output files may be associated with other output ports (e.g., the second and third ports). (Similarly, the wrapper for Bowtie2 may have other input ports defined for accepting an indexed reference genome and a set of sequence reads for alignment.) This approach thus provides a unique identifier—i.e., a hash value with an appended port number to each output file. In another embodiment, each output file is cryptographically salted with a unique identifier (e.g., a Docker ID, a file extension, or any random data); a hash function is subsequently applied to hash the salted output file and generate a unique hash value associated with each output file. This approach thus provides different hash values to different output files from the same processing step. Again, the hash function used in step 320 may be the same as other hash function utilized in any of the previous steps.

Figure 4:
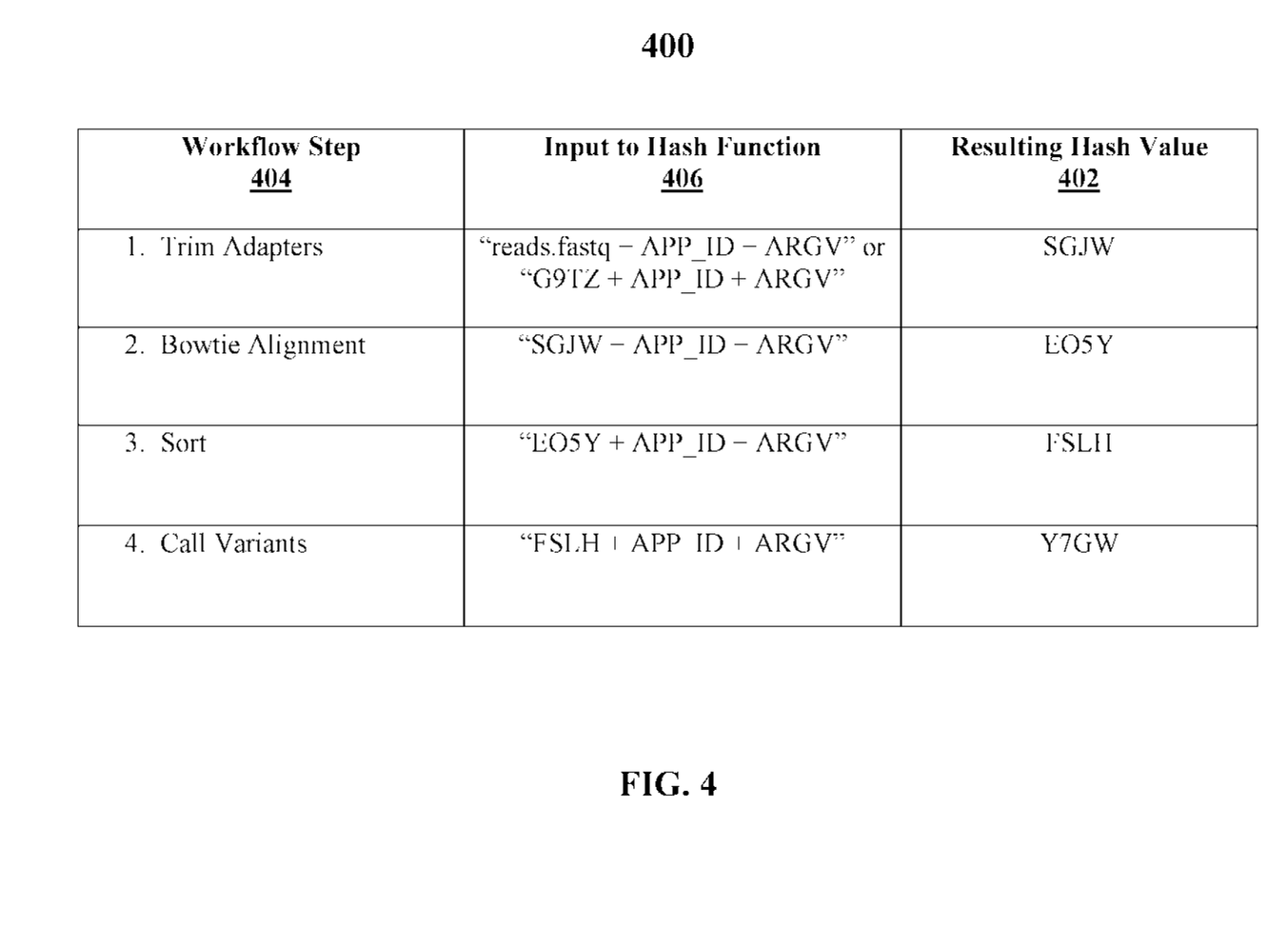
FIG. 4 illustrates an exemplary hash table in accordance with various embodiments.

FIG. 4 illustrates a hash table 400 created from the workflow of "bowtie_gatk" (see FIG. 1) using the approach as described above. The hash value 402 generated at each data-processing step 404 uniquely identifies its associated processing step, and is further included in an input 406 to the subsequent processing step. For example, the hash value "SGJW" uniquely identifying the first processing step "trim adapters" may form a portion of the input to the second data-processing step "Bowtie Alignment." Similarly, the hash value "EO5Y" uniquely identifying the second processing step "Bowtie Alignment" may form a portion of the input to the third data-processing step "Sort." This hash table 400 may then be leveraged for several useful purposes that can improve the processor's efficiency in facilitating workflow management, computation, and storage as further described below.

B. Applications of a Hash Table

Figure 5A:
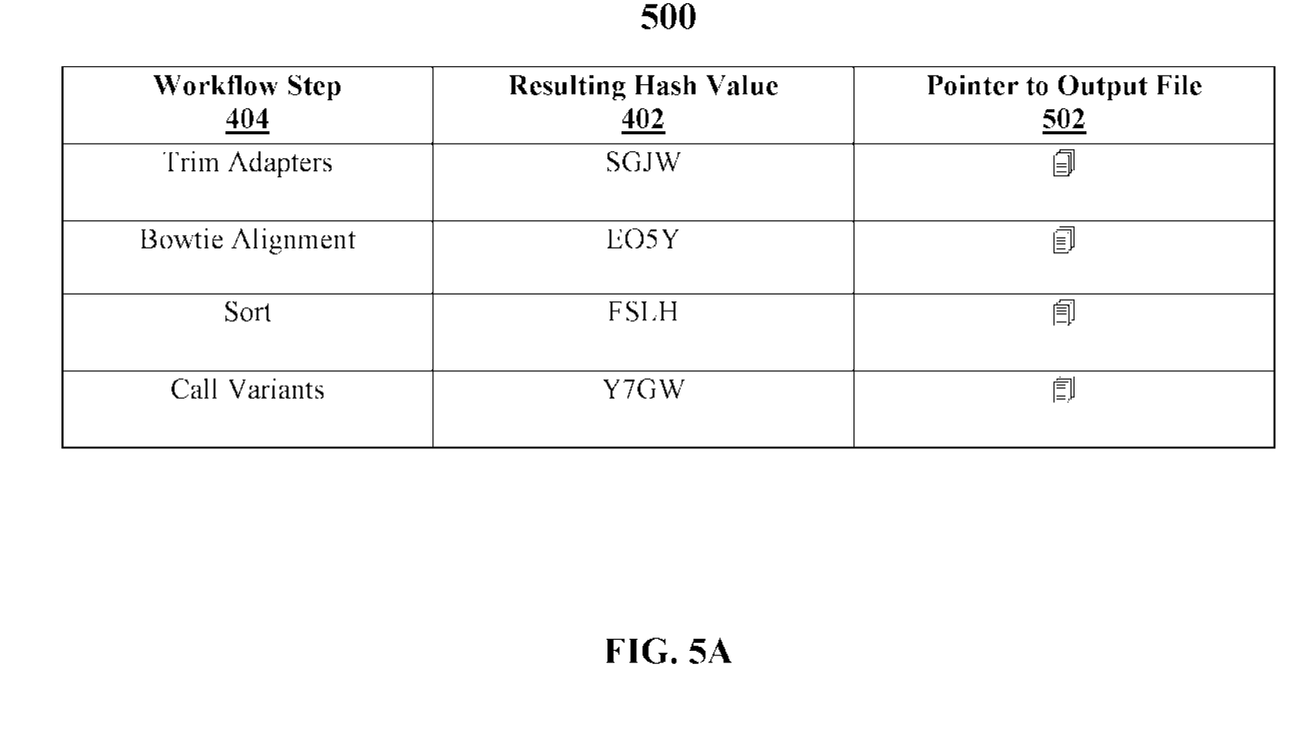
FIG. 5A illustrates another exemplary hash table in accordance with various embodiments.
Figure 5B:
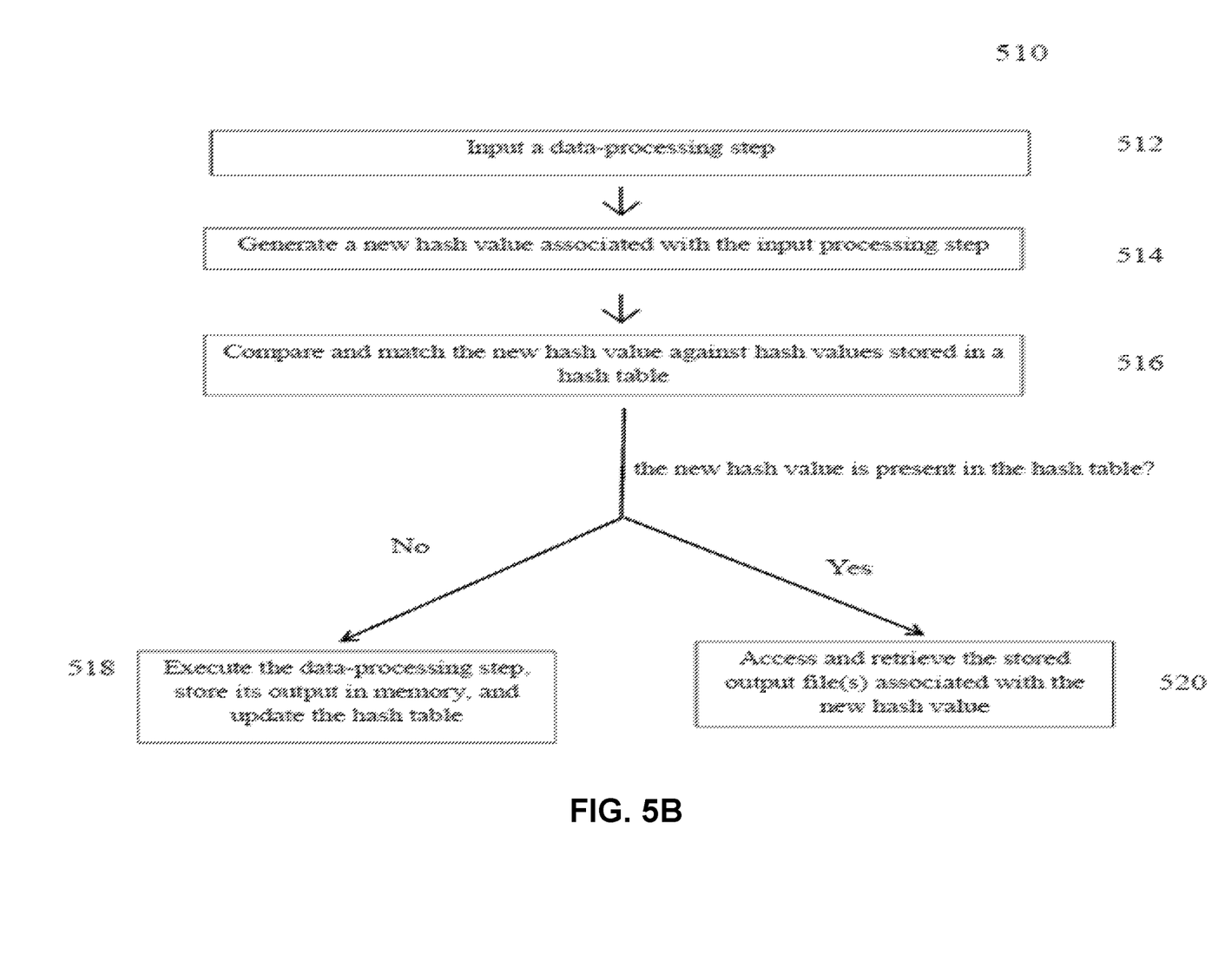
FIG. 5B is a flow chart illustrating an approach for caching a hash table and/or one or more output files of a data-processing step in accordance with various embodiments.

Referring to FIG. 5A, in various embodiments, a hash table 500 further includes pointers 502 that associate each hash value to the output file(s) of its associated data-processing step; the location of the output file(s) may then be returned to the processor for retrieval. In addition, the generated hash table and/or output files of each data-processing step may be cached to provide a fast lookup of the hash value and/or retrieval of the output file(s) for subsequent workflows. FIG. 5B is a flow chart 510 illustrating a representative embodiment of the lookup and retrieval process. In a first step 512, the processor first encounters a data-processing step in a subsequent workflow. In a second step 514, the processor generates a new hash value associated with the currently encountered processing step in the workflow. In a third step 516, the processor compares the newly generated hash value to the hash values stored in the hash table, seeking a match. The absence of the newly generated hash value from within the table indicates that the associated data-processing step has not been previously executed and a corresponding output file has not been stored. Accordingly, in a fourth step 518, the processor executes the current data-processing step, storing its resulting output in memory, and updating the hash table to include the newly generated hash value as well as a pointer associating the newly generated hash value with the output storage location.

If, on the other hand, the hash value of the current step is found in the hash table, the current processing step has been previously executed and an output file thereof has been stored in memory. The processor may then follow a pointer corresponding to the matching hash value to access and retrieve the output file(s) generated previously without performing any additional computation (in a fifth step 520).

Figure 6:
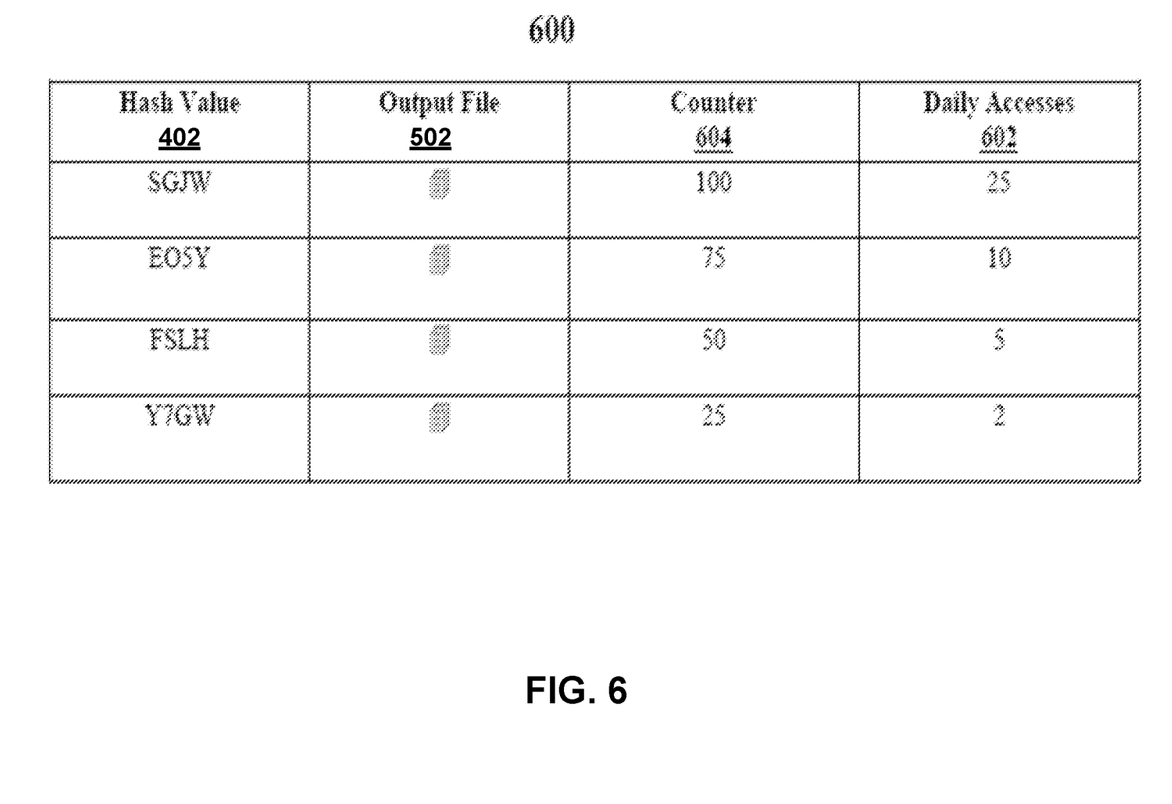
FIG. 6 illustrates another exemplary hash table in accordance with various embodiments.

In addition, the hash table may include further information that may be utilized for balancing the cost of long-term storage of cached files with the cost of re-executing the processing steps. For example, with reference to FIG. 6, the hash table 600 may include an accessing frequency 602 indicating the number of times the processor accesses each cached output file during a preceding period (e.g., day, week or month). If the accessing frequency of a cached file is above a predetermined threshold (e.g., 10 times per day), its associated data-processing step is used with sufficient frequency to justify storing the cached output file(s) in long-term memory. If, however, the accessing frequency is below the predetermined threshold, the output file(s) are not stored and the data-processing step will be re-executed in the future to re-generate an output; that is, the cost of storage is deemed to outweigh the cost of redundant processing. In some embodiments, the hash table further includes a counter value 604 that is monotonically incremented upon every access to the cached file. In one embodiment, the cost of long-term storage versus re-execution is evaluated when the counter value reaches a predetermined threshold (e.g., 50). Output files for which the retrieval counter value is reached in a relatively short time (e.g., less than one month) are stored in long-term memory, whereas other output files may be deleted from the memory to provide increased storage capacity. Accordingly, in conjunction with access frequencies and/or counter values, the hash table may advantageously provide a basis for optimizing the tradeoff between data storage and computational efficiency.

Figure 7A:
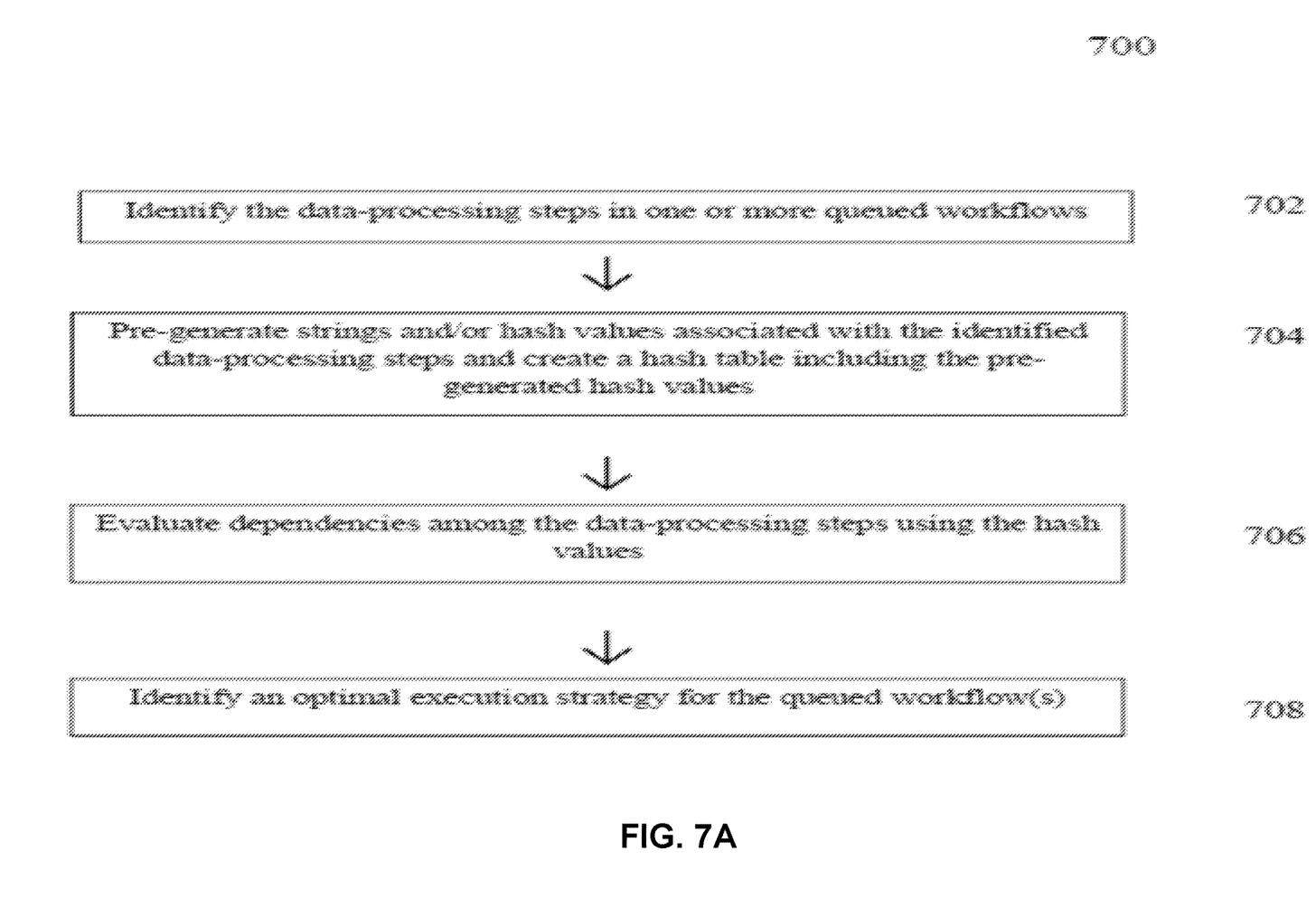
FIGS. 7A and 7B illustrate an approach for dynamically optimizing a workflow prior to its execution in accordance with various embodiments.

In addition, the hash table may allow one or more queued workflows to be dynamically optimized prior to execution (as shown in FIG. 7A). To optimize the workflow efficiency, in a first step 702, the computer processor processes the queued workflow to identify the data-processing steps included therein. In a second step 704, the processor pre-generates the unique strings and hash values of the identified data-processing steps and creates a hash table including the pre-generated hash values. As described above, each hash value generated in a processing step may include a hash value from a previous processing step. The actual tool for each step, however, is not executed, such that the output data from the associated task is not generated at this stage. In a third step 706, the processor evaluates dependencies among the data-processing steps using the table of hash values. For example, the processor may identify instances in which workflow steps have identical hash values; these instances represent output data that may be shared between the workflows. Therefore, in one embodiment, only one of the instances having the same hash value is unmarked and executed to create output files, whereas the other instances are marked as not executed. For example, the instances may be a pre-processing step (e.g., adapter trimming) applied to the same initial set of sequence reads and generating the same output files. This pre-processing step may then be executed once and the output therefrom is shared between various workflows. In a fourth step 708, based on the identified instances, the processor identifies or generates an optimal execution strategy for the queued workflow. For example, the processor may execute a task corresponding to the unmarked instance and create the output data. The marked instances corresponding to the executed unmarked instance (i.e., having the identical hash values) may then be marked as "complete" and not executed; workflows including the marked instances may then be modified and processed by the subsequent steps that require the generated output data as an input. Similarly, the processor may mark the instances as paused or waiting for data; once the output data is generated, the subsequent step after the instance may be allowed to execute.

Figure 7B:
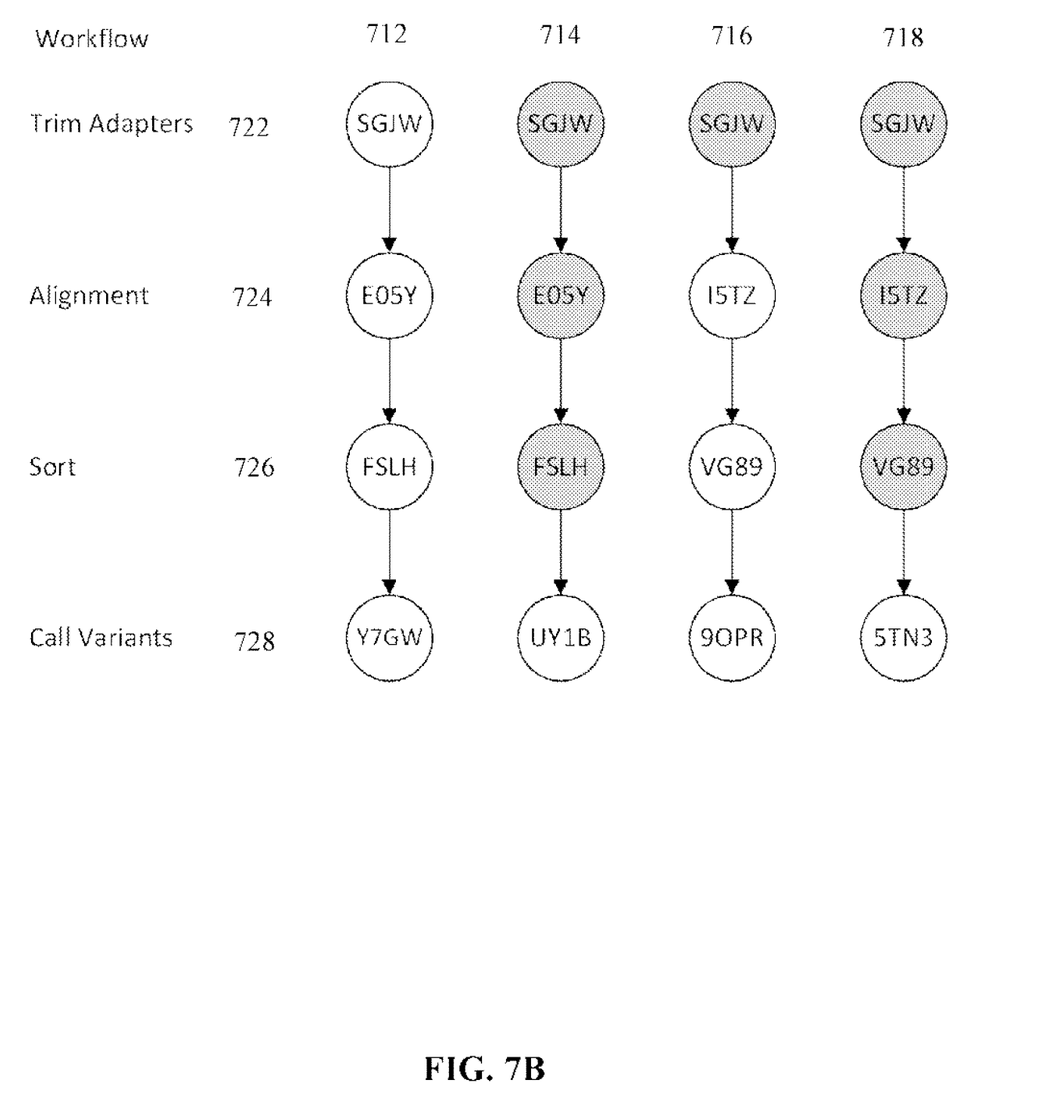

FIG. 7B depicts an exemplary workflow environment having four workflows 712-718 that are queued, but not yet executed. Each workflow includes a pre-processing step (such as adapter trimming) 722, a reference alignment step 724, a sorting step 726, and a variant calling step 728. In this example, workflows 712-718 include the same pre-processing step 722 that is executed on the same initial set of sequence reads and generates the same output files. In addition, each workflow includes the same sorting step 726. But workflows 712 and 714 use Bowtie2 for reference alignment, while workflows 716 and 718 use BWA. Additionally, workflows 712 and 716 use GATK for variant calling and workflows 714 and 718 use FreeBayes. Upon the processor identifying each step in the workflows 712-718 and generating the hash values associated therewith (as shown in FIG. 7B), the processor may identify instances that have an identical hash value and can thereby share the output files. For example, at the adapter trimming step 722, each workflow yields the same hash value ("SGJW"), and thus only one of these adapter trimming steps needs to be executed. The unexecuted steps may be marked as complete, i.e., no need for execution (shown in grey in FIG. 7B). At the alignment stage 724, because Bowtie and BWA yield different hash values (E05Y and I5TZ, respectively), only one Bowtie2 in workflow 712 or 714 and one BWA in workflow 716 or 718 needs to be executed. In this example, Bowtie2 in workflow 712 and BWA in workflow 716 are executed, while Bowtie2 in workflow 714 and BWA in workflow 718 are not executed (and thus are marked in grey). The sorting steps are similarly processed. Finally, each variant calling step 728 needs to be executed independently, as each variant generates a unique hash value in each workflow. As a result of this approach, the workflows have been optimized to reduce the total number of operations from 16 to 9.

This approach is particularly useful in a large workflow environment where multiple workflows including tens of thousands of processing steps are implemented. Hashing all the processing steps in all workflows using the approach described above may enable the processor to quickly evaluate each processing step and automatically reduce the number of executed tasks. As a result, redundant processing can be avoided although execution of each workflow is kept logically separate from other workflows. This approach thus advantageously provides considerable savings in both computation time of the processor and storage space of the memory.

Further, the hash table generated in accordance with various embodiments of the present invention is user-agnostic—i.e., each hash value encapsulates the workflow history up to the point of its associated output file and includes no information about the particular user executing the workflow. Accordingly, various users may "share" the hash table and/or output files that have been previously generated by other users and simultaneously execute similar workflows. This feature is essentially invisible to the end user (other than a faster computation and a reduced bill). Additionally, data sharing using the hash table may not raise any privacy concerns as it is possible to allow only users having authorization to access certain output files to generate the hash values necessary to access the cached outputs.

Accordingly, by generating a hash value that implicitly encapsulates the full history of the data-processing steps involved in generating an output file, the current invention avoids various problems of conventional workflow managing approaches, e.g., where the inputs and outputs are hashed and the histories of the outputs are explicitly solved. In addition, by pre-computing hash values associated with the processing steps in a workflow environment, the current invention allows the computer processor to elegantly manage complex webs of branching intermediate file usages and optimize the workflow prior to its execution. Further, the present invention may minimize redundancy of executing workflows. For example, conventional workflow hashing techniques typically incorporate an explicit recitation of parameters and inputs; thus, if the filenames differ, identical files may be associated with different hash values, leading to duplication of data. In contrast, the present invention incorporates the previous hash value to generate the current hash value and implicitly identifies the context and output of the current step without requiring explicit file names or parameters; this advantageously provides tolerance of different naming conventions, simplification of the file representation, and minimization of needed storage space. Moreover, the improvements are entirely transparent to end users, who need not reconfigure their workflows to experience improved results.

C. Representative Architecture

Figure 8:
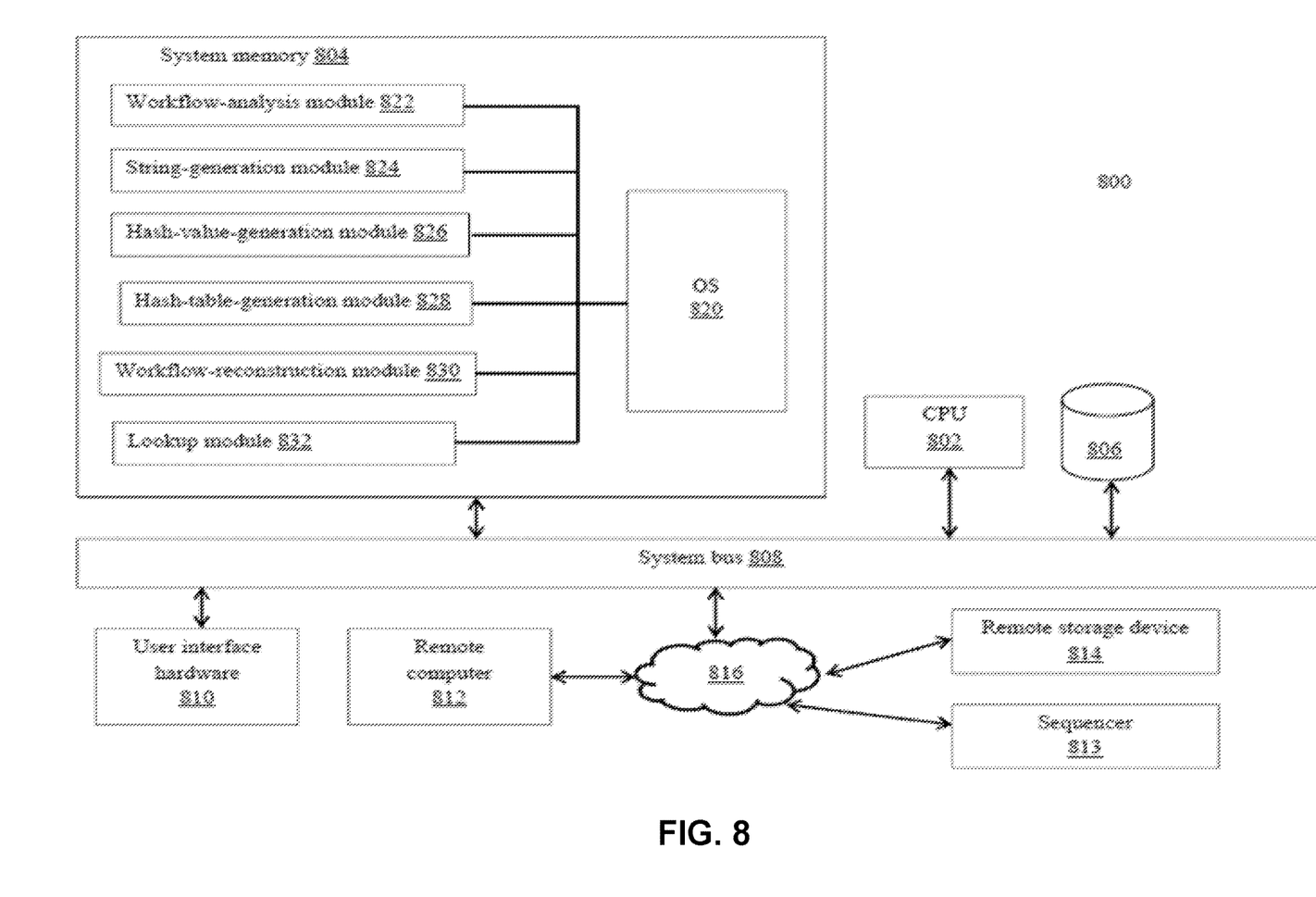
FIG. 8 is a block diagram illustrating a workflow-processing and managing facility in accordance with various embodiments.

Methods for generation and/or application of a hash table in accordance herewith can be implemented in any suitable combination of hardware, software, firmware, or hardwiring. FIG. 8 illustrates an exemplary embodiment where the facility is provided by a suitably programmed general-purpose computer 800. The computer includes a central processing unit (CPU) 802, system memory 804, and non-volatile mass storage devices 806 (such as, e.g., one or more hard disks and/or optical storage units). The computer 800 further includes a bidirectional system bus 808 over which the CPU 802, memory 804, and storage devices 806 communicate with each other and with internal or external input/output devices, such as traditional user interface components 810 (including, e.g., a screen, a keyboard, and a mouse) as well as a remote computer 812, a nucleic-acid sequencer 813, and a remote storage device 814 via one or more networks 816. The sequencer 813 may be a "next-generation" sequencer (NGS) that sequentially identifies the bases of small fragments of nucleic acid from signals emitted as each fragment is re-synthesized from a template strand. NGS machines replicate these reactions in a massively parallel fashion, enabling rapid sequencing of large stretches of DNA base pairs spanning entire genomes. Thus, sequencer 813 may first fragment a genomic DNA (gDNA) sample into a library of small segments that can be uniformly and accurately sequenced in parallel reactions. The identified strings of bases (i.e., reads) may be reassembled by the computer 800 or remote computer 812 (which acts as a sequencer computer) using a known reference genome as a scaffold (resequencing), or in the absence of a reference genome (de novo sequencing). In other embodiments or for particular purposes, the sequencer 813 utilizes Sanger sequencing.

The system memory 804 contains instructions, conceptually illustrated as a group of modules, that control the operation of CPU 802 and its interaction with the other hardware components. An operating system 820 directs the execution of low-level, basic system functions such as memory allocation, file management and operation of mass storage devices 806. At a higher level, one or more service applications provide the computational functionality required for generating and/or applying a hash table. For example, as illustrated, the system may include a workflow-analysis module 822 for identifying the data-processing steps in a workflow, a string-generation module 824 for generating a string describing each data-processing step in the workflow, a hash-value-generation module 826 for generating a hash value associated with each data-processing step based on its describing string, a hash-table-generation module 828 for generating a hash table including the hash values and/or other information about the data-processing step, a workflow-reconstruction module 830 for reconstruction of a computational state (e.g., an order of execution of the data-processing steps) of the workflow, and a lookup module 832 for determining whether any hash values in the hash table match a newly generated hash value. The lookup module may further follow a pointer associated with the matching hash value to access and retrieve output file(s) stored in the memory 804 and/or storage devices 806. In some embodiments, the lookup module causes the hash-table-generation module to include a newly generated hash value and information associated therewith.

In some embodiments, the source of read sequence data and/or a previously generated hash table is the remote storage device 814. For example, the user of computer 800 may download the read sequence data and/or the previously generated hash table from a university or government server over the Internet using a local browser. In a "cloud" service architecture, computer 800 operates as a server, and client computers 812 interact with server 800 over the network 816—e.g., directing read sequence data and/or hash table to the server 400. The client computers 812 may be any suitable computational entities, e.g., desktop computers or workstations, laptops, tablets, or smart phones, and will include a computer memory (e.g., RAM) for storing instructions and data, a processor for executing instructions, a network interface for communication, a user interface (e.g., a display/touchscreen), and storage (e.g., flash memory or a solid-state or magnetic disk).

More generally, the computer shown in FIG. 8 is representative only and intended to provide one possible topology. It is possible to distribute the functionality illustrated in FIG. 8 among more or fewer computational entities as desired. The network 816 may include a wired or wireless local-area network (LAN), wide-area network (WAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include the cellular telecommunications infrastructure, WiFi or other 802.11 protocol, Bluetooth, Zigbee, IrDa or other suitable protocol. Furthermore, components of the system may communicate through a combination of wired or wireless paths.

Any suitable programming language may be used to implement without undue experimentation the analytical functions described within. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of data storage and retrieval for a computer memory, the method comprising:
  processing a computational workflow comprising a plurality of sequential, linked data-processing steps each performed by a computer application, at least some of the data-processing steps utilizing, as input data, output data generated by a previous data-processing step, wherein the workflow includes a plurality of bioinformatics tools;
  generating and storing a plurality of hash values, at least one of the hash values being (i) associated with one of the plurality of data-processing steps and (ii) based at least in part on a hash value associated with a previous data-processing step;
  associating the hash values with information related to the associated steps, wherein the information comprises an identifier for the associated step, an output from the associated step, or a frequency of accessing the output from the associated step, wherein the method further comprises caching at least one of the hash values based at least in part on the accessing frequency thereof;
  determining if any of the plurality of data-processing steps in the computational workflow produces a plurality of outputs after each execution, and, if so,
  assigning a secondary identifier to each one of the produced outputs; and generating and storing a new hash value associated with each one of the outputs based at least in part on the assigned secondary identifier; and
  following interruption or completion of the workflow, reconstructing a computational state of the workflow based at least in part on hash values associated with steps performed prior to the interruption or completion of the workflow, thereby avoiding re-execution of one or more steps of the workflow that were completed prior to the interruption or completion of the workflow, wherein the reconstructed computational state of the workflow comprises history information including execution status of the data-processing steps in the workflow up to the interruption or completion thereof.

2. The method of claim 1, wherein the reconstructed computational state comprises an order of execution of the data-processing steps in the computational workflow.

3. The method of claim 1, further comprising creating a first identifier associated with a first one of the steps based at least in part on the input to the first step and storing the first identifier, the hash value corresponding to the first step being generated based on the first identifier.

4. The method of claim 3, wherein the first identifier comprises a concatenation of the input to the first step, an application associated with the first step, and a parameter of the first step.

5. Apparatus for data storage and retrieval, the apparatus comprising:
   a computer memory;
   a non-transitory storage device for data storage and retrieval; and
   a computer processor configured to:
   execute applications in accordance with instructions stored in the memory;
   process a computational workflow comprising a plurality of sequential, linked data-processing steps each performed by a computer application, at least some of the data-processing steps utilizing, as input data, output data generated by a previous data-processing step, wherein the workflow includes a plurality of bioinformatics tools;
   generate and store a plurality of hash values, at least one of the hash values being (i) associated with one of the plurality of data-processing steps and (ii) based at least in part on a hash value associated with a previous data-processing step;
   associating the hash values with information related to the associated steps, wherein the information comprises an identifier for the associated step, an output from the associated step, or a frequency of accessing the output from the associated step, wherein the method further comprises caching at least one of the hash values based at least in part on the accessing frequency thereof;
   determining if any of the plurality of data-processing steps in the computational workflow produces a plurality of outputs after each execution, and, if so,
   assigning a secondary identifier to each one of the produced outputs; and generating and storing a new hash value associated with each one of the outputs based at least in part on the assigned secondary identifier; and
   following interruption or completion of the workflow, reconstruct a computational state of the workflow based at least in part on hash values associated with steps performed prior to the interruption or completion of the workflow, thereby avoiding re-execution of one or more steps of the workflow that were completed prior to the interruption or completion of the workflow,
   wherein the reconstructed computational state of the workflow comprises history information including execution status of the data-processing steps in the workflow up to the interruption or completion thereof.

6. The apparatus of claim 5, wherein the reconstructed computational state comprises an order of execution of the data-processing steps in the computational workflow.

7. The apparatus of claim 5, wherein the computer processor is further configured to create a first identifier associated with a first one of the steps based at least in part on the input to the first step and storing the first identifier, the hash value corresponding to the first step being generated based on the first identifier.

8. The apparatus of claim 7, wherein the first identifier comprises a concatenation of the input to the first step, an application associated with the first step, and a parameter of the first step.

9. A method of data storage and retrieval for a computer memory, the method comprising:
   processing a computational workflow comprising a plurality of sequential, linked data-processing steps each performed by a computer application, at least some of the data-processing steps utilizing, as input data, output data generated by a previous data-processing step and generating a plurality of output files, wherein the workflow includes a plurality of bioinformatics tools;
   generating and storing a plurality of hash values, at least one of the hash values being (i) associated with one of the plurality of data-processing steps and (ii) based at least in part on a hash value associated with a previous data-processing step, wherein at least two of the output files are assigned the same hash value, and wherein the hash value associated with each said output file is appended with a port number of a data-processing step associated with the output file; and
   following interruption or completion of the workflow, reconstructing a computational state of the workflow based at least in part on hash values associated with steps performed prior to the interruption or completion of the workflow, thereby avoiding re-execution of one or more steps of the workflow that were completed prior to the interruption or completion of the workflow,
   wherein the reconstructed computational state of the workflow comprises history information of the data-processing steps in the workflow up to the interruption or completion thereof.

10. The method of claim 9, wherein the reconstructed computational state comprises an order of execution of the data-processing steps in the computational workflow.

11. The method of claim 9, further comprising creating a first identifier associated with a first one of the steps based at least in part on the input to the first step and storing the first identifier, the hash value corresponding to the first step being generated based on the first identifier.

12. The method of claim 11, wherein the first identifier comprises a concatenation of the input to the first step, an application associated with the first step, and a parameter of the first step.

13. Apparatus for data storage and retrieval, the apparatus comprising:
   a computer memory;
   a non-transitory storage device for data storage and retrieval; and
   a computer processor configured to:
   execute applications in accordance with instructions stored in the memory;
   process a computational workflow comprising a plurality of sequential, linked data-processing steps each performed by a computer application, at least some of the data-processing steps utilizing, as input data, output data generated by a previous data-processing step and generating a plurality of output files;
   generate and store a plurality of hash values, at least one of the hash values being (i) associated with one of the plurality of data-processing steps and (ii) based at least in part on a hash value associated with a previous data-processing step, wherein at least two of the output files are assigned the same hash value, and wherein the hash value associated with each said output file is appended with a port number of a data-processing step associated with the output file; and following interruption or completion of the workflow, reconstruct a computational state of the workflow based at least in part on hash values associated with steps performed prior to the interruption or completion of the workflow and a name of the at least one file, thereby avoiding re-execution of one or more steps of the workflow that were completed prior to the interruption or completion of the workflow, wherein the reconstructed computational state of the workflow comprises history information of the data-processing steps in the workflow up to the interruption or completion thereof.

14. The apparatus of claim 13, wherein the computer processor is further configured to associate the hash values with information related to the associated steps, wherein the information comprises an identifier for the associated step, an output from the associated step, or a frequency of accessing the output from the associated step, wherein the method further comprises caching at least one of the hash values based at least in part on the accessing frequency thereof.

* * * * *